(12) United States Patent
Shibata et al.

(10) Patent No.: US 12,088,511 B2
(45) Date of Patent: Sep. 10, 2024

(54) COMMUNICATION SYSTEM, COMMUNICATION METHOD, TRANSMITTING SIDE SWITCHING DEVICE, RECEIVING SIDE SWITCHING DEVICE, AND PROGRAM

(71) Applicant: Nippon Telegraph and Telephone Corporation, Tokyo (JP)

(72) Inventors: Nobuhiro Shibata, Musashino (JP); Hideo Kawata, Musashino (JP); Hideaki Kimura, Musashino (JP); Shinichi Yoshihara, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 183 days.

(21) Appl. No.: 17/802,202

(22) PCT Filed: Feb. 28, 2020

(86) PCT No.: PCT/JP2020/008465
§ 371 (c)(1),
(2) Date: Aug. 25, 2022

(87) PCT Pub. No.: WO2021/171597
PCT Pub. Date: Sep. 2, 2021

(65) Prior Publication Data
US 2023/0336501 A1    Oct. 19, 2023

(51) Int. Cl.
*H04L 49/25* (2022.01)
*H04L 49/15* (2022.01)
*H04L 49/90* (2022.01)

(52) U.S. Cl.
CPC .............. *H04L 49/25* (2013.01); *H04L 49/15* (2013.01); *H04L 49/90* (2013.01)

(58) Field of Classification Search
CPC .......... H04L 45/18; H04L 49/15; H04L 49/25; H04L 49/90
See application file for complete search history.

(56) References Cited

U.S. PATENT DOCUMENTS 9,319,335 B1 *  4/2016  Tripathi .............. H04L 12/6418
2001/0019554 A1 *  9/2001  Nomura ................ H04L 45/502
                                                         370/392
(Continued)

FOREIGN PATENT DOCUMENTS

EP         1768328 A1 *  3/2007  ............... H04L 1/08
JP         2007019698      1/2007
(Continued)

OTHER PUBLICATIONS

[No Author Listed] [online], "IEEE Standard for Local and Metropolitan Area Networks: Media Access Control (MAC) Bridges," IEEE Std 802.1D™-2004, Jun. 9, 2004, 45 pages.

(Continued)

Primary Examiner — Wutchung Chu
(74) Attorney, Agent, or Firm — Fish & Richardson P.C.

(57) ABSTRACT

An object is to provide a communication system, a communication method, a transmission-side switching device, a reception-side switching device, and a program that can carry out network switching of a plurality of L2NWs with a short communication disconnection time without limiting topology.
A transmission-side accommodation SW duplicates a frame received from a transmission-side user device and transfers the frame to a plurality of L2NWs to which the transmission-side accommodation SW is connected. When receiving a frame from any one of the plurality of L2NWs to which a reception-side accommodation SW is connected, the reception-side accommodation SW transfers, to a reception-side user device, only a frame from one L2NW allowed to (Continued)

transfer a frame to an access accommodation port and discards frames from the other L2NWs. At a switching time of the L2NWs, the reception-side accommodation SW changes the L2NW allowed to transmit a frame to the access accommodation port.

5 Claims, 12 Drawing Sheets

(56) References Cited

U.S. PATENT DOCUMENTS

| | | | | |
|---|---|---|---|---|
| 2012/0127877 A1* | 5/2012 | Watanabe | ............... | H04L 47/22 |
| | | | | 370/252 |
| 2015/0222558 A1* | 8/2015 | Maeda | ................ | H04L 49/9057 |
| | | | | 370/412 |
| 2019/0199609 A1* | 6/2019 | Hammerle | .............. | H04L 43/08 |

FOREIGN PATENT DOCUMENTS

| | | | | |
|---|---|---|---|---|
| JP | 2015144390 A * | 8/2015 | ............. | H04L 47/32 |
| JP | WO2019220596 A1 * | 11/2019 | | |
| WO | WO 2019220596 | 11/2019 | | |
| WO | WO-2019220596 A1 * | 11/2019 | ............. | H04L 47/32 |

OTHER PUBLICATIONS

Terauchi et al., "The High Reliable Network System based on Layer 2 Technology," IEICE Technical Report, 2005, 105(75):7-12, 13 pages (with English Translation).

* cited by examiner (A)

| L2NW NAME | USER IDENTIFIER (VLAN-ID OR THE LIKE) | RELAY PORT |
|---|---|---|
| L2NW(1) | 100 | T01,T02 |
| L2NW(2) | 100 | T11,T12 |

Fig. 11

| L2NW NAME | USER IDENTIFIER (VLAN-ID OR THE LIKE) | AP TRANSFER INFORMATION |
|---|---|---|
| L2NW(1) | 100 | TRANSFER |
| L2NW(2) | 100 | DISCARD |

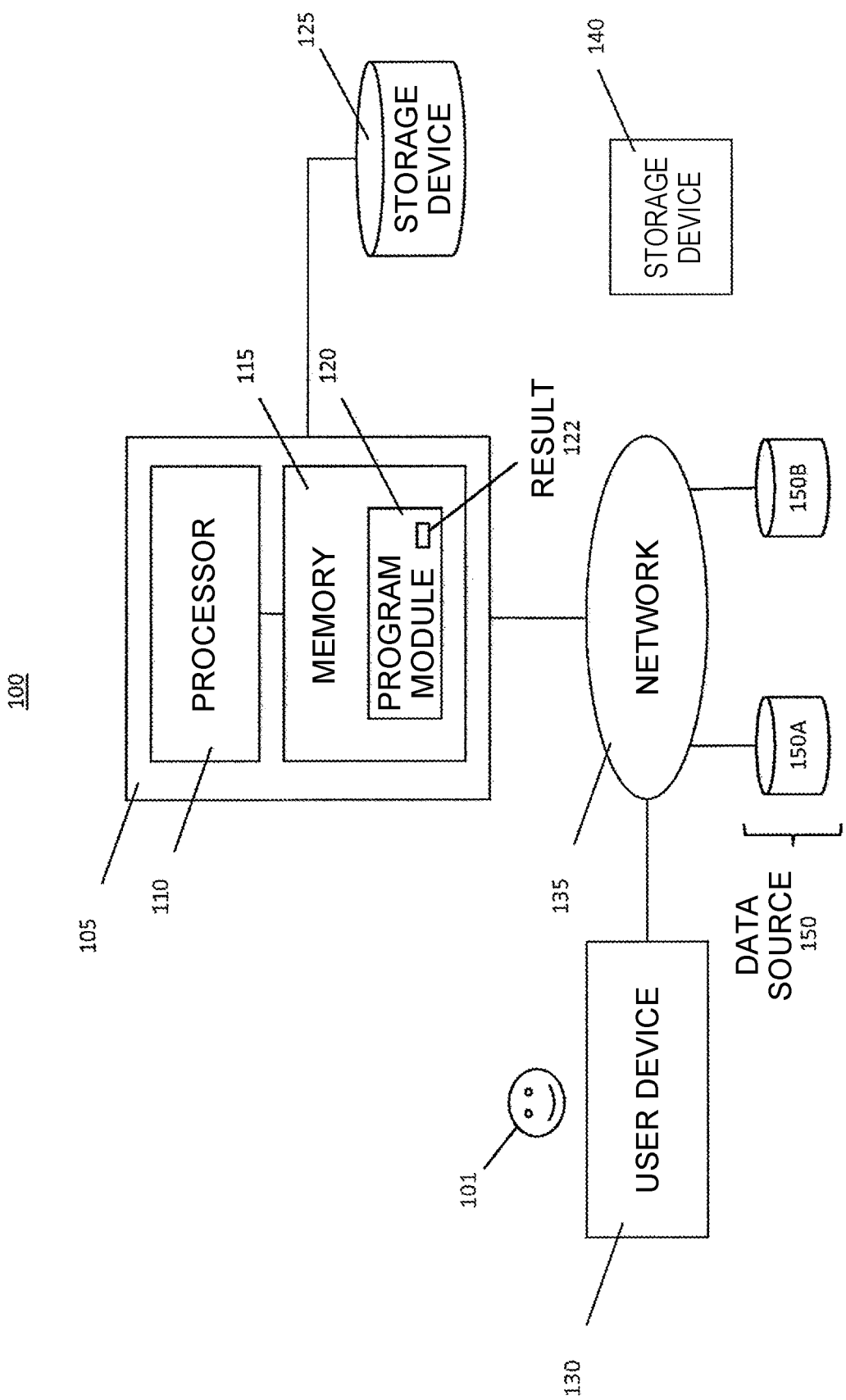

COMMUNICATION SYSTEM, COMMUNICATION METHOD, TRANSMITTING SIDE SWITCHING DEVICE, RECEIVING SIDE SWITCHING DEVICE, AND PROGRAM

CROSS-REFERENCE TO RELATED APPLICATIONS

This application is a National Stage application under 35 U.S.C. § 371 of International Application No. PCT/JP2020/008465, having an International Filing Date of Feb. 28, 2020, the disclosure of which is considered part of the disclosure of this application, and is incorporated by reference in its entirety into this application.

TECHNICAL FIELD

The present disclosure relates to a communication system that selects any one of a plurality of L2NWs (layer 2 networks) and performs communication, a communication method, a transmission-side switching device, a reception-side switching device, and a program for the devices.

BACKGROUND ART

In a network applied with an Ethernet (registered trademark) technology (hereinafter, L2NW), devices determine a route between switches while learning MAC addresses in an independent distributed manner. Therefore, when a ring-like wire connection is present in the network, it is likely that a loop of a frame occurs to cause congestion. In order to prevent the loop, measures such as an STP (Spanning Tree Protocol) described in Non-Patent Literature 1 and an ERP (Ethernet Ring Protection) described in Patent Literature 1 are taken. These counter-loop technologies deliberately disable communication in a part of a route and construct a logical tree structure in the network to prevent a loop of a frame.

CITATION LIST

Patent Literature

Patent Literature 1: Japanese Patent Laid-Open No. 2007-019698

Non-Patent Literature

Non-Patent Literature 1: IEEE Std 802.1D-2004, IEEE Standard for Local and Metropolitan Area Networks: Media Access Control (MAC) Bridges, "17. Rapid Spanning Tree Protocol (RSTP)"

SUMMARY OF THE INVENTION

Technical Problem

When switching a route of the L2NW, the STP performs calculation of route cost for treating a variety of parameters for determining a network configuration. Therefore, the STP has a problem in that a calculation time for determining a route increases because of a large number of parameters, it takes time for route switching, and a communication disconnection time increases. The ERP has a problem in versatility because topology is limited to a ring.

In this way, the existing technologies such as the STP and the ERP have a problem in that it is difficult to carry out network switching of a plurality of L2NWs with a short communication disconnection time without limiting topology.

Therefore, in order to solve the problems, an object of the present invention is to provide a communication system, a communication method, a transmission-side switching device, a reception-side switching device, and a program that can carry out network switching of a plurality of L2NWs with a short communication disconnection time without limiting topology.

Means for Solving the Problem

In order to achieve the object, a communication system according to the present invention duplicates a frame that a transmission-side switching device is about to transmit and transmits the frame to all L2NWs between the transmission-side switching device and a reception-side switching device, and the reception-side switching device selects one from the plurality of L2NWs and receives the frame.

Specifically, the communication system according to the present invention is a communication system in which the transmission-side switching device and the reception-side switching device are connected to a plurality of layer 2 networks (L2NWs), the transmission-side switching device including:
transmission-side relay ports to which the respective L2NWs are connected;
a transmission-side-connection-destination-information storing unit that retains information concerning each of the transmission-side relay ports and the L2NWs; and
a frame duplicating unit that duplicates, by a number of the transmission-side relay ports, a frame input from a transmission-side user device and transmits duplicated frames to all the L2NWs connected to the transmission-side relay ports, the reception-side switching device including:
reception-side relay ports to which the respective L2NWs are connected;
an access accommodation port to which a reception-side user device is connected;
a reception-side-connection-destination-information storing unit that retains information concerning each of the reception-side relay ports and the L2NWs;
a transfer-information storing unit that retains transfer information describing whether frame transfer to the access accommodation port is allowed for each of the L2NWs;
a frame selecting unit that transfers, based on the transfer information retained by the transfer-information storing unit, to the access accommodation port, one frame selected out of frames from all the L2NWs received via the reception-side relay ports; and
an information setting unit that changes the transfer information retained by the transfer-information storing unit when the L2NW transmitting a frame currently transferred to the access accommodation port is switched to another one of the L2NWs.

A communication method according to the present invention is a communication method in a communication system in which a transmission-side switching device and a reception-side switching device are connected to a plurality of layer 2 networks (L2NWs), the communication method being performed from the transmission-side switching device, the communication method including:

duplicating a frame input from the transmission-side user device;

transmitting duplicated frames to all the L2NWs from the transmission-side switching device;

transferring, based on transfer information describing whether frame transfer to a reception-side user device is allowed for each of the L2NWs, to the reception-side user device, one frame selected out of frames from all the L2NWs; and changing the transfer information when the L2NW transmitting a frame currently transferred to the reception-side user device is switched to another one of the L2NWs.

A transmission-side switching device according to the present invention is a transmission-side switching device connected to a reception-side switching device by a plurality of layer 2 networks (L2NWs), the transmission-side switching device including:

transmission-side relay ports to which the respective L2NWs are connected;

a transmission-side-connection-destination-information storing unit that retains information concerning each of the transmission-side relay ports and the L2NWs; and a frame duplicating unit that duplicates, by a number of the transmission-side relay ports, a frame input from a transmission-side user device and transmits duplicated frames to all the L2NWs connected to the transmission-side relay ports.

A reception-side switching device according to the present invention is a reception-side switching device connected to a transmission-side switching device by a plurality of layer 2 networks (L2NWs), the reception-side switching device including:

reception-side relay ports to which the respective L2NWs are connected;

an access accommodation port to which a reception-side user device is connected;

a reception-side-connection-destination-information storing unit that retains information concerning each of the reception-side relay ports and the L2NWs;

a transfer-information storing unit that retains transfer information describing whether frame transfer to the access accommodation port is allowed for each of the L2NWs;

a frame selecting unit that transfers, based on the transfer information retained by the transfer-information storing unit, to the access accommodation port, one frame selected out of frames from all the L2NWs received via the reception-side relay ports; and an information setting unit that changes the transfer information retained by the transfer-information storing unit when the L2NW transmitting a frame currently transferred to the access accommodation port is switched to another one of the L2NWs.

In the following explanation, a transmission-side switching device is described as "transmission-side accommodation SW" and a reception-side switching device is described as "reception-side accommodation SW".

The transmission-side accommodation SW of this communication system duplicates a frame and transfers, without considering topology, the frame to all L2NWs to which the transmission-side accommodation SW is connected. Consequently, this communication system can establish a route between user devices in a form passing through the L2NWs.

On the other hand, before L2NW switching, when receiving frames from the L2NWs to which the reception-side accommodation SW is connected, the reception-side accommodation SW of this communication system selects only a preset frame from the L2NW allowed to transfer the frame to the user devices and discards the frames from the other L2NWs. Therefore, this communication system can prevent redundant transfer of the frames from the reception-side accommodation SW to the user devices.

In the case of BUM traffic (traffic of broadcast, unicast to an unknown destination, and multicast), the reception-side accommodation SW prohibits, based on information concerning connected L2NWs, transfer of a frame received from one L2NW to other L2NWs. Consequently, this communication system can prevent the frame from looping over a plurality of L2NWs.

Further, when receiving a switching notification of the L2NWs, the reception-side accommodation SW of this communication system immediately switches the L2NW allowed to transfer a frame to the user devices. Therefore, this communication system can reduce a communication disconnection time at the switching time of the L2NW.

Therefore, the present invention can provide a communication system, a communication method, a transmission-side switching device, and a reception-side switching device that can carry out network switching of a plurality of L2NWs with a short communication disconnection time without limiting topology.

The transmission-side switching device of the communication system according to the present invention further includes a frame-information imparting unit that, when the frame selecting unit of the reception-side switching device is intended to select a frame transmitted by any one L2NW among the L2NWs, imparts switching information to a frame input from the user device and passes, to the frame duplicating unit, the frame to which the switching information is imparted.

The reception-side switching device of the communication system according to the present invention further includes a frame confirming unit that confirms presence or absence of a frame to which the switching information is imparted among frames from all the L2NWs received via the reception-side relay ports and, when the frame is present, changes, based on the switching information, the transfer information retained by the transfer-information storing unit.

This communication system can perform network switching from the transmission-side accommodation SW as well.

The reception-side switching device of the communication system according to the present invention further includes:

a buffer that stores, for each of the L2NWs, frames from the L2NWs; and a comparing unit that compares, among the L2NWs, the frames stored in the buffer, wherein the comparing unit performs:

first comparison for, at a point in time when the transfer information is about to be changed, setting a frame from the L2NW transmitting a frame currently transferred to the access accommodation port as a reference and comparing the frame and a frame from the L2NW transmitting a frame to be transferred to the access accommodation port in future, among the frames stored in the buffer; and second comparison for setting the frame from the L2NW transmitting the frame to be transferred to the access accommodation port in future as a reference and comparing the frame and the frame from the L2NW transmitting the frame currently transferred to the access accommodation port, if the frames are same in the first comparison, sends, to the frame selecting unit, among the frames stored in the buffer, frames up to the frame from the L2NW transmitting the frame to be transferred to the access accommodation port in future, the frame being an immediately preceding frame successfully confirmed as being the same frame, and, thereafter, enables a change of the transfer information, if the frames are the same in the second comparison, sends, to the frame selecting unit, among the frames stored in the buffer, frames up to the frame from the L2NW transmitting the frame currently transferred to the access accommodation port, the frame being an immediately preceding frame successfully confirmed as being the same frame, and, thereafter, enables a change of the transfer information, and if the frames are not the same in the first comparison and not the same in the second comparison either, disables a change of the transfer information and performs the first comparison and the second comparison again with a next frame of the L2NW transmitting a frame that is not the reference among the frames stored in the buffer.

This communication system can prevent a frame loss and redundant transfer at a network switching time.

The present invention is a program for causing a computer to function as the transmission-side switching device or the reception-side switching device. The transmission-side accommodation SW and the reception-side accommodation SW of the present invention can be realized by the computer and the program as well. The program can be recorded in a recording medium or can be provided through a network.

Note that the inventions explained above can be combined as much as possible.

Effects of the Invention

The present invention can provide a communication system, a communication method, a transmission-side switching device, a reception-side switching device, and a program that can carry out network switching of a plurality of L2NWs with a short communication disconnection time without limiting topology.

BRIEF DESCRIPTION OF DRAWINGS

FIG. 10 is a diagram for explaining information retained by a connection-information retaining unit included in the communication system according to the present invention.

FIG. 11 is a diagram for explaining transfer information retained by a transfer-information retaining unit included in the communication system according to the present invention.

FIG. 12 is a diagram for explaining the communication system according to the present invention.

DESCRIPTION OF EMBODIMENTS

Figure 1:
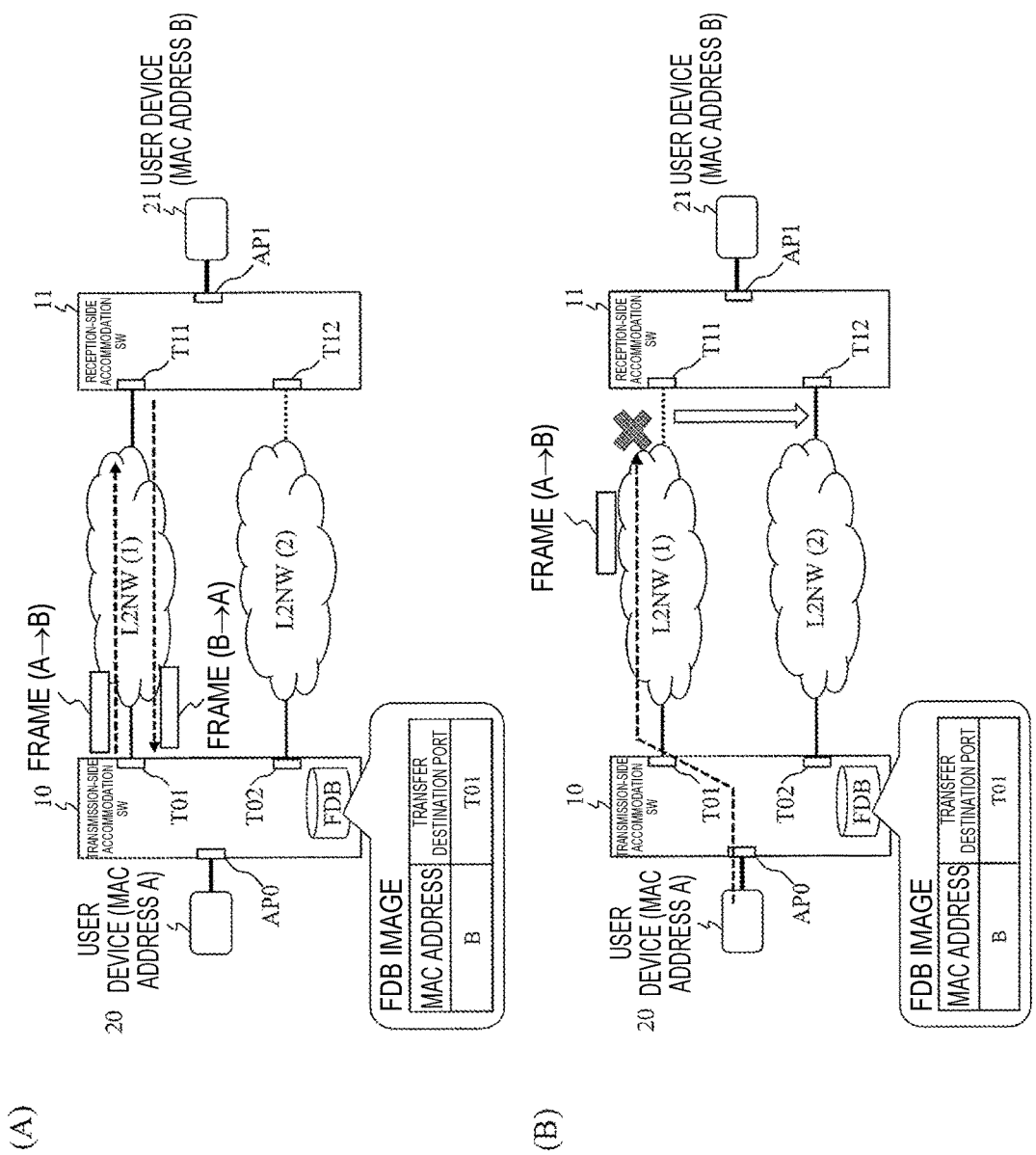
FIG. 1 is a diagram for explaining a problem of the present invention.

Embodiments of the present invention are explained with reference to the accompanying drawings. The embodiments explained below are implementation examples of the present invention. The present invention is not limited to the embodiments explained below. Note that constituent elements denoted by the same reference numerals and signs in this specification and the drawings indicate the same constituent elements one another.

Overview of the Invention

Figure 2:
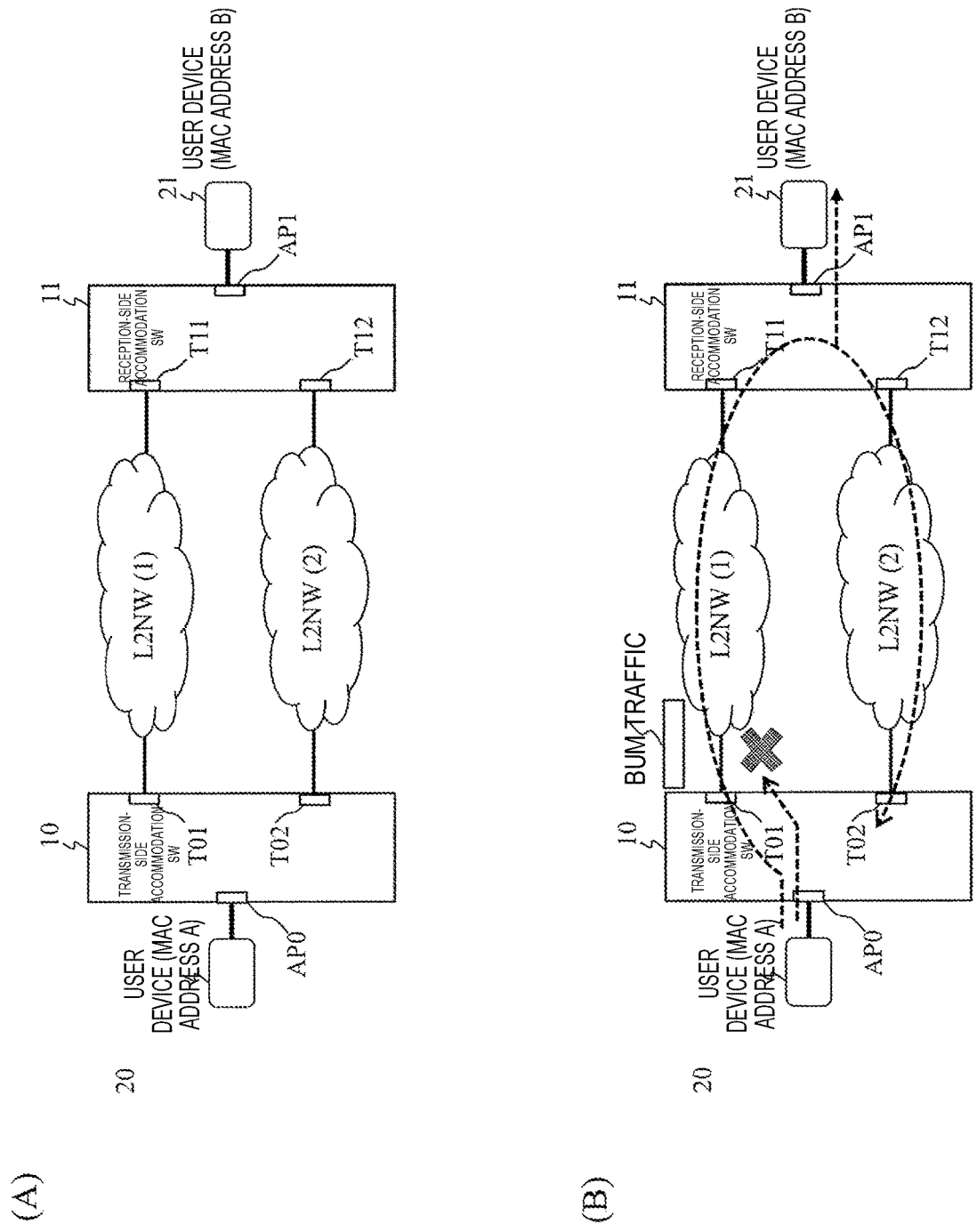
FIG. 2 is a diagram for explaining a problem of the present invention.

FIG. 1 and FIG. 2 are diagrams for explaining problems of the present invention.

A communication system that performs work for switching one L2NW used for frame transfer from a user to another L2NW is assumed.

FIG. 1 is a diagram for explaining a problem 1. In an L2NW, a transmission-side accommodation SW 10 transfers a frame based on a Forwarding DataBase (FDB). The FDB has an aging time. When the transmission-side accommodation SW 10 does not receive a frame from a user device 21 for a set aging time (ex: 300 s), a target FDB is deleted.

First, a state shown in FIG. 1(A) is a state in which one L2NW(1) connects the transmission-side accommodation SW 10 and a reception-side accommodation SW 11 and another L2NW(2) is not connected to the reception-side accommodation SW 11. The transmission-side accommodation SW 10 receives a frame (B->A) from the user device 21 and causes the FDB to learn that the user device 21 (a MAC address B) is connected to a relay port T01. After the learning, when a user device 20 transmits a frame (A->B) to the user device 21, the transmission-side accommodation SW 10 transfers the frame (A->B) to the relay port T01 based on information concerning the learned FDB.

Subsequently, for example, it is assumed that reconnection of a cable is performed and, as shown in FIG. 1(B), an L2NW to which the reception-side accommodation SW 11 is connected is switched from (1) to (2). However, the FDB learning information of the user device 21 remains in the transmission-side accommodation SW 10. The transmission-side accommodation SW 10 transfers the frame (A->B) to the relay port T01 even after the switching to the L2NW of the reception-side accommodation SW 11. However, since the reception-side accommodation SW 11 is not connected to the L2NW(1), the reception-side accommodation SW 11 cannot receive the frame (A->B). Therefore, a frame does not reach from the user device 20 to the user device 21.

In this way, the communication system that selects one of a plurality of L2NWs and performs communication has a problem in that, when the L2NW to which the reception-side accommodation SW 11 is connected is switched, the FDB learning information is not erased until aging time expiration in the transmission-side accommodation SW 10 and communication disconnection occurs. This is the problem 1.

FIG. 2 is a diagram for explaining a problem 2.

First, as shown in FIG. 2(A), in order to reduce a switching time for L2NWs, the transmission-side accommodation SW 10 and the reception-side accommodation SW 11 are connected by the L2NW(1) and the L2NW(2) beforehand. In this state, a loop passing through the transmission-side accommodation SW 10, the L2NW(1), the reception-side accommodation SW 11, and the L2NW(2) in order is formed.

It is assumed that the user device 20 transmits BUM traffic in this state. Then, as shown in FIG. 2(B), the BUM traffic is endlessly continuously transferred in the loop and presses a user band of the communication system (occurrence of congestion). When the congestion occurs, the user device 20 cannot transmit a new frame and traffic to the user device 21.

In this way, the communication system that causes all the plurality of L2NWs between the transmission-side accommodation SW 10 and the reception-side accommodation SW 11 to communicate for switching time reduction has a problem in that congestion of a network occurs in the transmission of the BUM traffic. This is the problem 2.

In order to solve the problem 1 and the problem 2, that is, minimize a time period of communication disconnection involved in switching work and avoid a loop of the BUM traffic, first, a communication system 301 connects the transmission-side accommodation SW 10 and the reception-side accommodation SW 11 with the plurality of L2NWs. Subsequently, the communication system 301 transfers a frame from the transmission-side accommodation SW 10 to all the L2NWs and selects the L2NW to be received by the reception-side accommodation SW 11.

The transmission-side accommodation SW 10 connected to the plurality of L2NWs duplicates a frame when transmitting the frame and transfers the frame to all the L2NWs. Before L2NW switching, when the reception-side accommodation SW 11 receives frames from the plurality of L2NWs, the reception-side accommodation SW 11 transfers, to an access accommodation port (AP1), only the frame of the L2NW for which transfer to the AP1 is permitted beforehand. The reception-side accommodation SW 11 discards the frames from the L2NW for which transfer to the AP1 is not permitted.

In the case of the BUM traffic, the reception-side accommodation SW 11 prohibits, based on the L2NW information included in the reception-side accommodation SW 11, frame transfer to the L2NWs other than the L2NW that receives the BUM traffic. By receiving an L2NW switching notification, the reception-side accommodation SW 11 changes the L2NW for which transfer to the AP1 is permitted and performs switching of the L2NW.

First Embodiment

Figure 3:
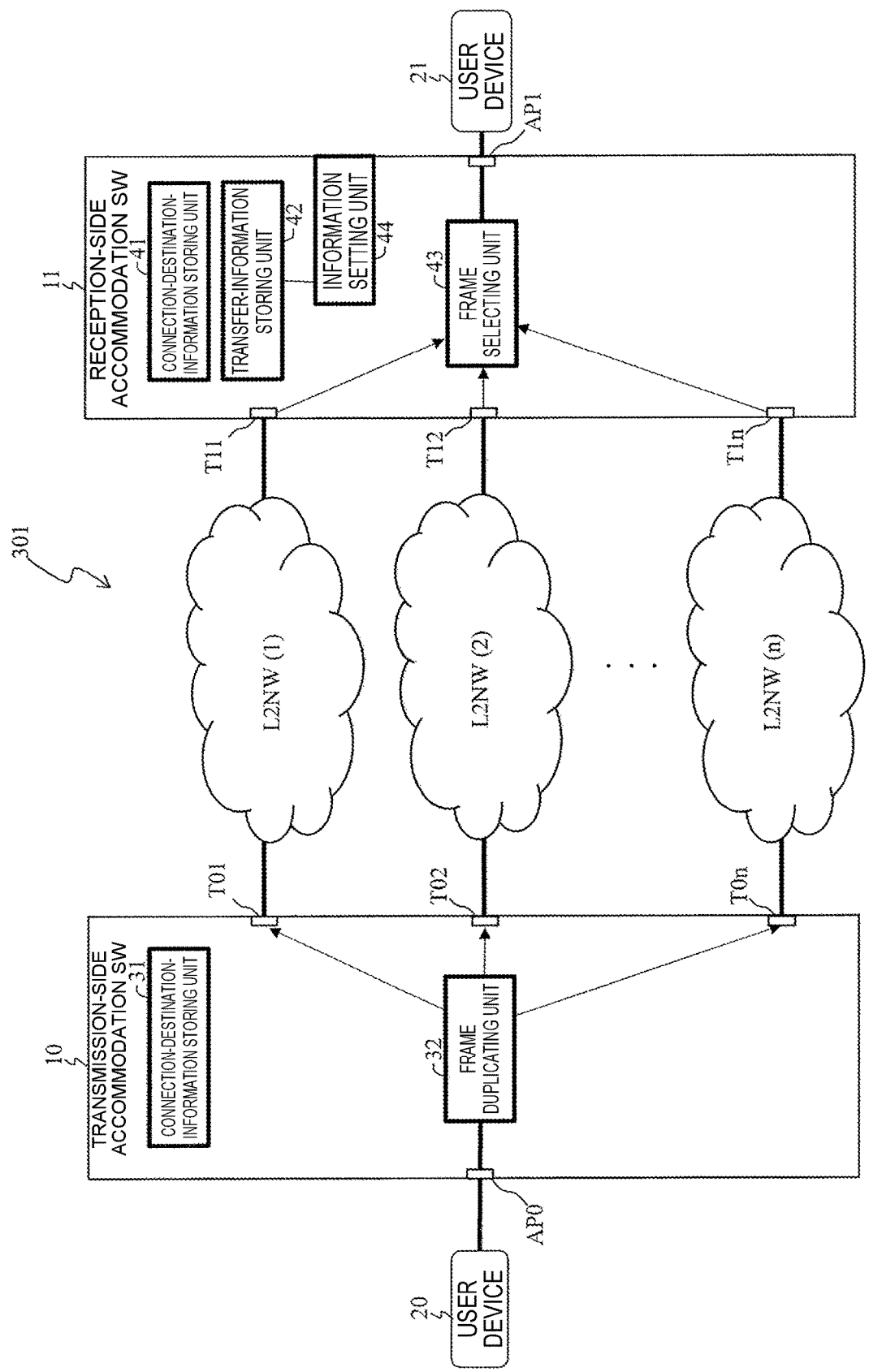
FIG. 3 is a diagram for explaining a communication system according to the present invention.

FIG. 3 is a diagram for explaining a communication device 301 in this embodiment. The communication device 301 is a communication system in which the transmission-side accommodation SW 10 and the reception-side accommodation SW 11 are connected to a plurality of L2NWs(1) to (n) (n is an integer equal to or larger than 2), the transmission-side accommodation SW 10 including:
transmission-side relay ports (T01 to T0n) to which the respective L2NWs(1) to (n) are connected;
a transmission-side-connection-destination-information storing unit 31 that retains information concerning each of the transmission-side relay ports (T01 to T0n) and the L2NWs(1) to (n); and
a frame duplicating unit 32 that duplicates, by the number of the transmission-side relay ports (T01 to T0n), a frame input from a transmission-side user device 20 and transmits duplicated frames to all the L2NWs (1) to (n) connected to the transmission-side relay ports (T01 to T0n), the reception-side switching device 11 including:
reception-side relay ports (T11 to T1n) to which the respective L2NWs(1) to (n) are connected;
an access accommodation port AP1 to which a reception-side user device 21 is connected;
a reception-side-connection-destination-information storing unit 41 that retains information concerning each of the reception-side relay ports (T11 to T1n) and the L2NWs(1) to (n);
a transfer-information storing unit 42 that retains transfer information describing whether frame transfer to the access accommodation port AP1 is allowed for each of the L2NWs;
a frame selecting unit 43 that transfers, based on the transfer information retained by the transfer-information storing unit 42, to the access accommodation port AP1, one frame selected out of frames from all the L2NWs(1) to (n) received via the reception-side relay ports (T11 to T1n); and
an information setting unit 44 that changes the transfer information retained by the transfer-information storing unit 42 when the L2NW transmitting a frame currently transferred to the access accommodation port AP1 is switched to another one of the L2NWs.

Figure 4:
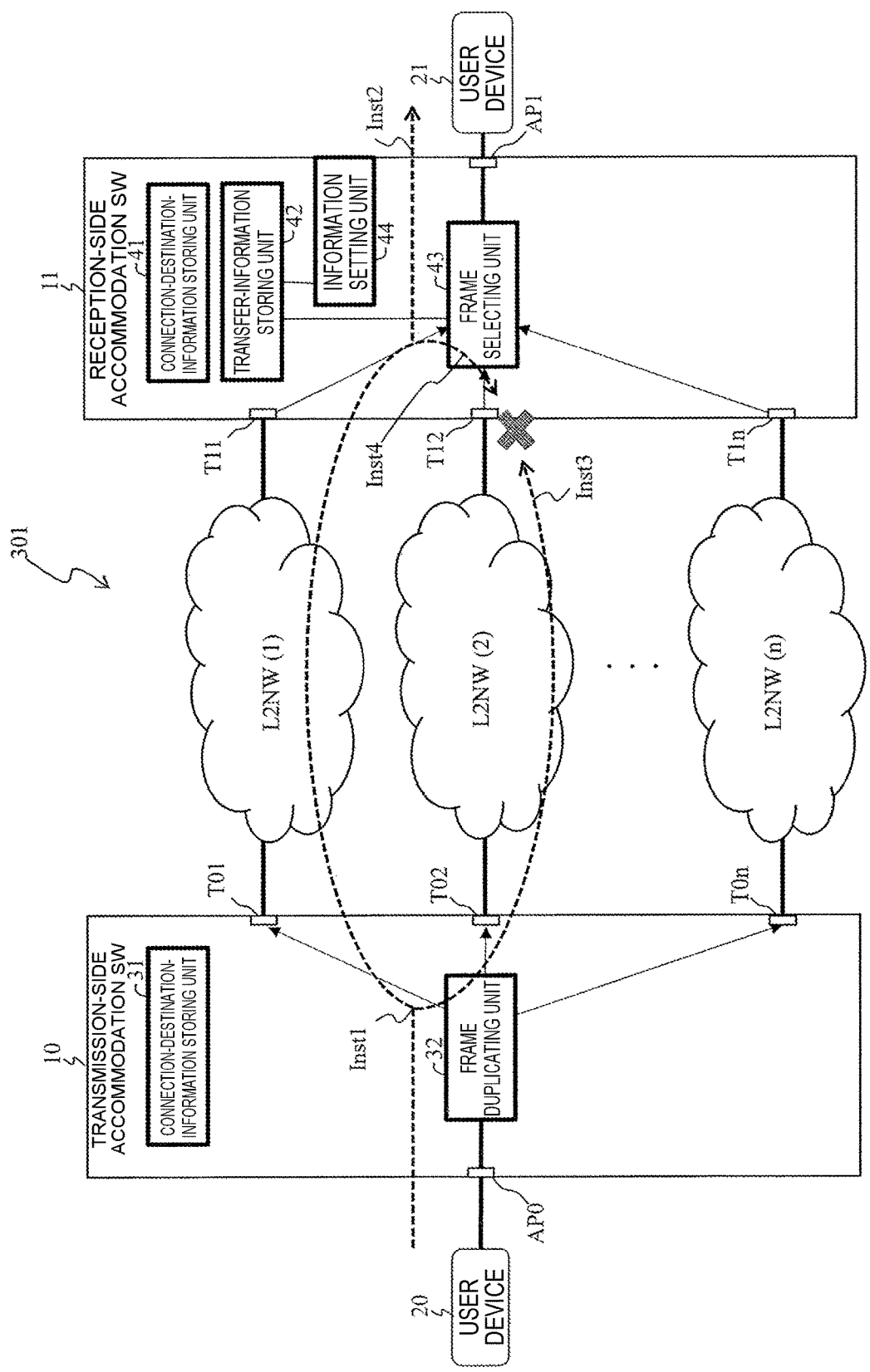
FIG. 4 is a diagram for explaining the communication system according to the present invention.

The operation of the communication system 301 is further explained with reference to FIG. 4 and FIG. 5.

The transmission-side accommodation SW 10 is connected to the user device 20 via a transmission-side access storage point AP0. The reception-side accommodation SW 11 is connected to the user device 21 via a reception-side access storage point AP1. The transmission-side accommodation SW 10 and the reception-side accommodation SW 11 are connected through any one of the L2NWs.

The connection-destination-information storing unit 31 of the transmission-side accommodation SW 10 and the connection-destination-information storing unit 41 of the reception-side accommodation SW 11 register, as in an example shown in FIG. 10, a "connection destination L2NW name" and "relay port information" and a "user identifier (VLAN-ID or the like)" connected to the L2NW. A plurality of relay ports can be linked to one L2NW at a connection destination.

The transfer-information storing unit 42 of the reception-side accommodation SW 11 registers, as in an example shown in FIG. 11, transfer information such as a "connection destination L2NW name", a "user identifier (VLAN-ID or the like)", and "AP transfer information". The "connection destination L2NW name" of the transfer-information storing unit 42 and the "connection destination L2NW name" of the connection-destination-information storing unit 41 are matched.

[Pre-Network Switching Operation]

First, an operation before network switching is explained with reference to FIG. 4.

When receiving a frame from the user device 20, the transmission-side accommodation SW 10 duplicates the frame in the frame duplicating unit 32 based on the information of the connection-destination-information storing unit 31 and transmits the frame to the connected respective L2NW(1) and L2NW(2) (Inst1).

When receiving frames from the L2NW(1) and the L2NW(2), the reception-side accommodation SW 11 determines, based on the information of the connection-destination-information storing unit 41, from which of the L2NWs the received frames are received. Thereafter, the frame selecting unit 43 transmits, based on the transfer information of the transfer-information storing unit 42, only a frame from the L2NW (in FIG. 4, the L2NW(1)) allowed to be transferred to the AP1 to the user device 21 (Inst2). On the other hand, the frame selecting unit 43 discards a frame from the L2NW (in FIG. 4, the L2NW(2)) not allowed to be transferred to the AP1 (Inst3). By discarding the frame from the L2NW not allowed to be transferred to the AP1 in the reception-side accommodation SW 11, it is possible to prevent a plurality of the same frames from being transferred to the user device 21 connected to the reception-side accommodation SW 11.

When the reception-side accommodation SW 11 receives BUM traffic, the frame selecting unit 43 does not carry out, based on the information of the connection-destination-information storing unit 41, frame transfer to the L2NW different from the L2NW from which the traffic is transmitted (Inst4). However, the frame selecting unit 43 may carry out frame transfer to the L2NW from which the traffic is transmitted. Since the frame selecting unit 43 does not carry out transfer of the BUM traffic to different L2NWs, it is possible to prevent occurrence of a loop in which the BUM traffic is transferred in the order of the transmission-side accommodation SW 10, the L2NW(1), the reception-side accommodation SW 11, and the L2NW(2) or a loop in which the BUM traffic is transferred in the order of the transmission-side accommodation SW 10, the L2NW(2), the reception-side accommodation SW 11, and the L2NW(1).

[Network Switching Time Operation]

Subsequently, an operation at a network switching time is explained with reference to FIG. 5.

The information setting unit 44 performs setting for switching the L2NW for the reception-side accommodation SW 11. Specifically, the information setting unit 44 is a Command Line Interface or the like.

The reception-side accommodation SW 11, for which the setting is performed, changes the transfer information of the transfer-information storing unit 42. For example, in the setting shown in FIG. 11, the reception-side accommodation SW 11 changes the "AP transfer information" of the L2NW (1) from "transfer" to "discard" and changes the "AP transfer information" of the L2NW(2) from "discard" to "transfer".

Figure 5:
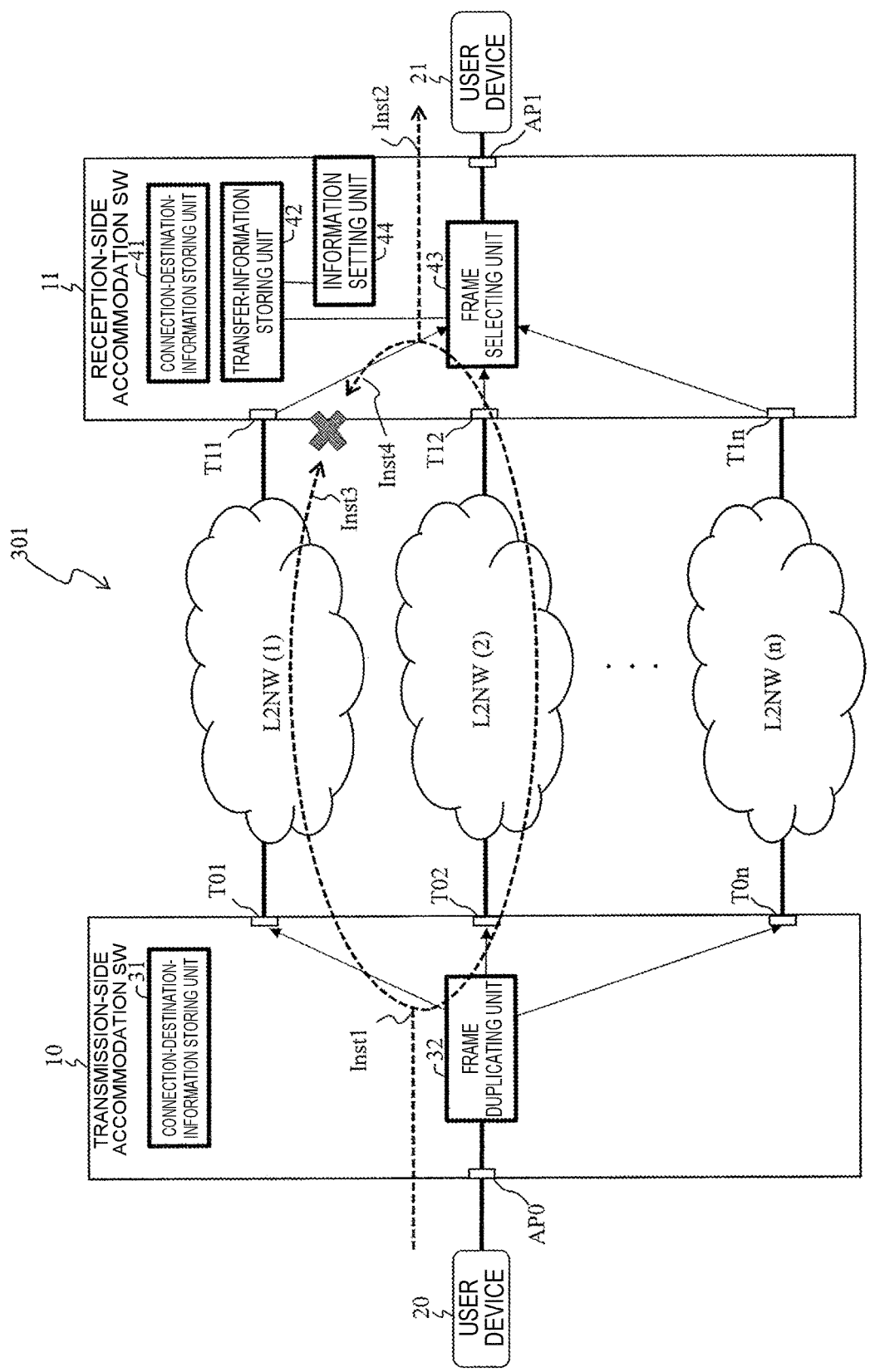
FIG. 5 is a diagram for explaining the communication system according to the present invention.

The frame selecting unit 43 transmits, based on the information of the connection-destination-information storing unit 41 and the transfer information of the transfer-information storing unit 42 after the change, to the user device 21, only a frame from the L2NW (in FIG. 5, the L2NW(2)) allowed to transfer the frame to the AP1 (Inst2). On the other hand, the frame selecting unit 43 discards a frame from the L2NW (in FIG. 5, the L2NW(1)) not allowed to transfer the frame to the AP1 (Inst3).

Note that, in FIG. 5, Inst1 and Inst4 are the same as those explained with reference to FIG. 4.

Effects of the First Embodiment

Since the transmission-side accommodation SW 10 duplicates a frame based on the information of the connection-destination-information storing unit 31 and transfer the frame to the L2NW(1) and the L2NW(2), the frame reaches the reception-side accommodation SW 11 via both the L2NWs. Therefore, even if the reception-side accommodation SW 11 changes information (transfer information) of the L2NW permitted to transfer the frame to the AP1, the reception-side accommodation SW 11 can receive the frame transferred through one of the L2NWs. Therefore, communication can be performed between the user device 20 and the user device 21 immediately after the L2NW switching.

Second Embodiment

Figure 6:
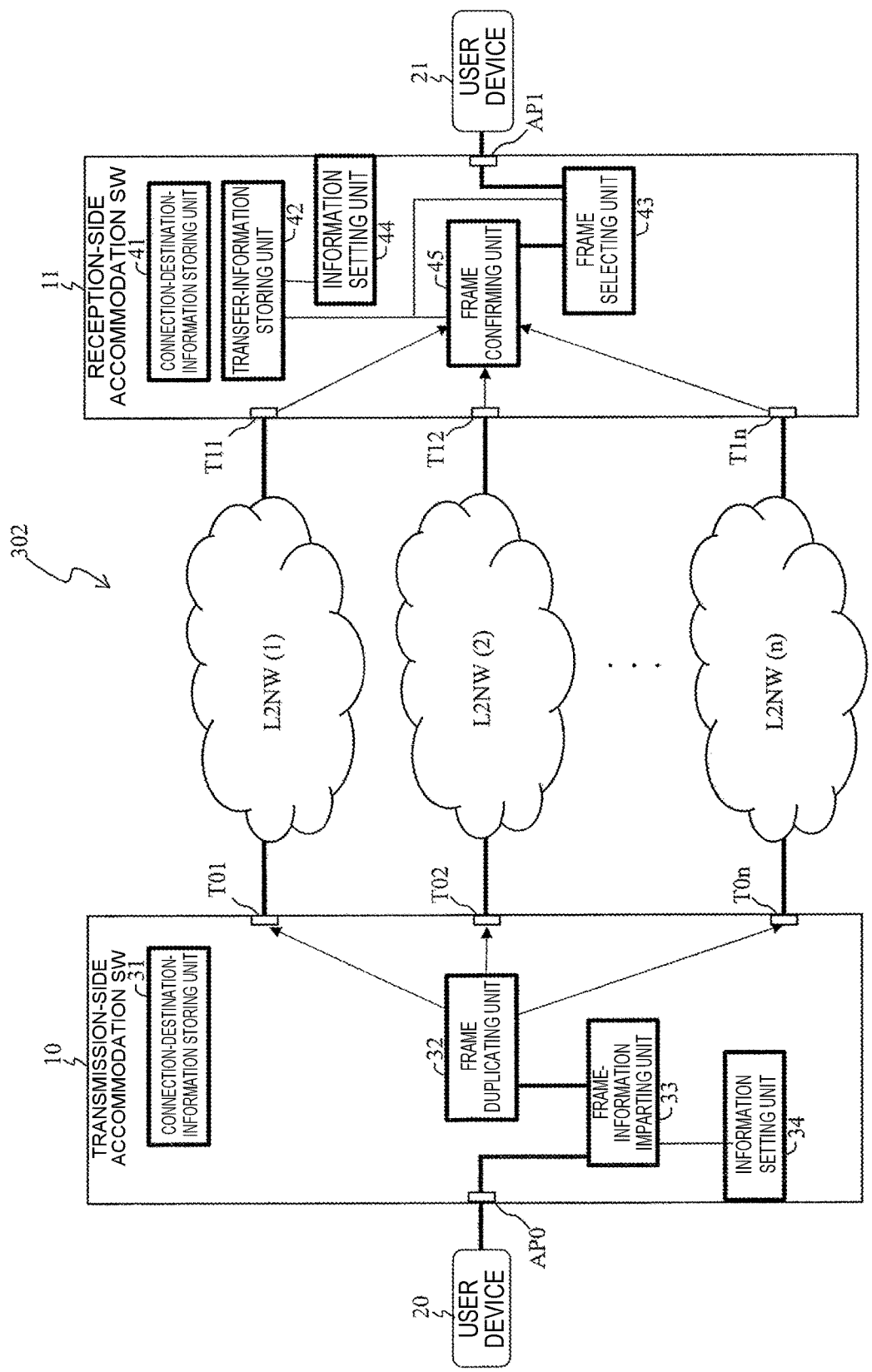
FIG. 6 is a diagram for explaining the communication system according to the present invention.

FIG. 6 is a diagram for explaining a communication system 302 in this embodiment. The communication system 302 is different from the communication system 301 in the first embodiment in that the communication system 302 further includes a frame-information imparting unit 33 in the transmission-side accommodation SW 10 and further includes a frame confirming unit 45 in the reception-side accommodation SW 11.

Specifically, the transmission-side accommodation SW 10 further includes a frame-information imparting unit 33 that, when the frame selecting unit 43 of the reception-side accommodation SW 11 is intended to select a frame transmitted by any one L2NW among the L2NWs, imparts switching information to a frame input from the user device 20 and passes, to the frame duplicating unit 32, the frame to which the switching information is imparted, and the reception-side accommodation SW 11 further includes a frame confirming unit 45 that confirms presence or absence of a frame to which the switching information is imparted among frames from all the L2NWs received via the reception-side relay ports (T11 to T1$n$) and, when the frame is present, changes, based on the switching information, the transfer information retained by the transfer-information storing unit 42.

[Pre-Network Switching Operation]

First, an operation before network switching is explained. Only an operation different from the operation of the communication system 301 in the first embodiment is explained.

Before NW switching, the frame-information imparting unit 33 of the transmission-side accommodation SW 10 causes a frame from the user device 20 to pass and passes the frame to the frame duplicating unit 32. The frame confirming unit 45 of the reception-side accommodation SW 11 confirms whether NW switching information is imparted to frames received from the L2NW(1) and the L2NW(2) and passes the frames to the frame selecting unit 43.

[Network Switching Time Operation]

Subsequently, an operation at a network switching time is explained. Only an operation different from the operation of the communication system 301 in the first embodiment is explained.

An information setting unit 34 performs setting for switching a L2NW for the transmission-side accommodation SW 10. Specifically, the information setting unit 34 is a Command Line Interface or the like. After the setting, the frame-information imparting unit 33 imparts NW switching information to a frame from the user device 20. The frame to which the NW switching information is imparted is duplicated by the frame duplicating unit 32 and transmitted by the L2NW(1) and the L2NW(2).

In the reception-side accommodation SW 11, the frame confirming unit 45 confirms whether the NW switching information is imparted to frames received from the L2NW (1) and the L2NW(2). When it is successfully confirmed that the NW switching information is imparted to the frames, the frame confirming unit 45 changes the transfer information retained by the transfer-information storing unit 42. For example, in the setting shown in FIG. 11, the frame confirming unit 45 changes the "AP transfer information" of the L2NW(1) from "transfer" to "discard" and changes the "AP transfer information" of the L2NW(2) from "discard" to "transfer".

The frame selecting unit 43 determines, based on the information of the connection-destination-information storing unit 41 and the transfer information of the transfer-information storing unit 42 after the change, whether transfer to the AP1 of a frame is allowed, as explained in the first embodiment.

Effects of the Second Embodiment

In the communication system 301 in the first embodiment, the switching of the L2NW is performed at a point in time when the L2NW switching to the reception-side accommodation SW 11 is performed. If the L2NW switching is performed in a state in which a frame does not arrive from the L2NW (the L2NW(2)) at a switching destination, it is likely that communication cannot be performed after the switching. In the communication system 302 in this embodiment, the reception-side accommodation SW 11 performs the L2NW switching at a point in time when frames to which the NW switching information is impaired are received from all the L2NWs to be connected. Therefore, in the communication system 302, the L2NW switching is performed after it is confirmed that the L2NW at the switching destination is conducted. Therefore, an event in which communication cannot be performed after the switching does not occur.

Third Embodiment

Figure 7:
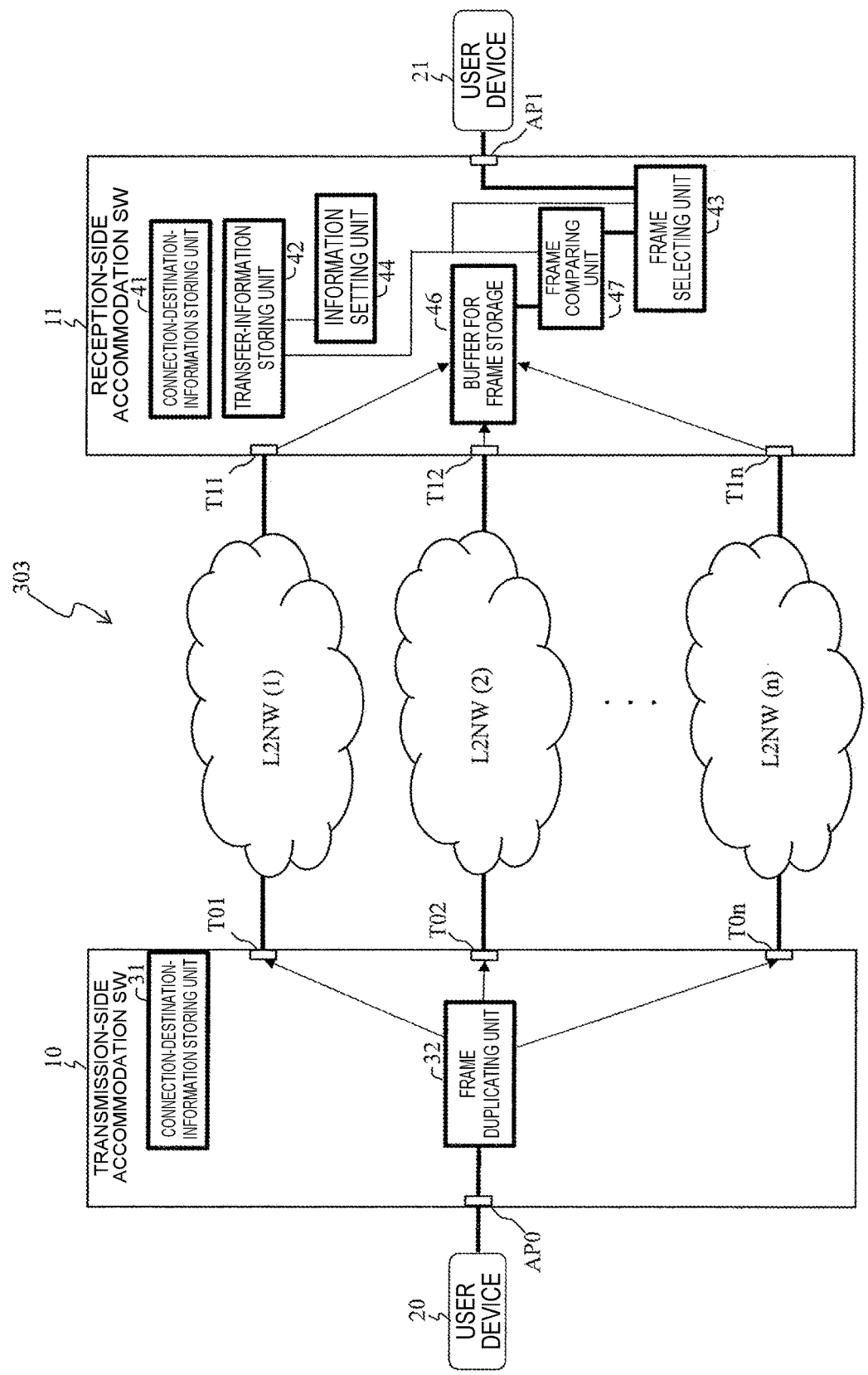
FIG. 7 is a diagram for explaining the communication system according to the present invention.

FIG. 7 is a diagram for explaining a communication system 303 in this embodiment. The communication system 303 is different from the communication system 301 in the first embodiment in that the communication system 303 further includes a buffer for frame storage 46 and a frame comparing unit 47 in the reception-side accommodation SW 11.

Specifically, the reception-side accommodation SW 11 further includes:

a buffer 46 that stores, for each of the L2NWs, frames from the L2NWs; and a comparing unit 47 that compares, among the L2NWs, the frames stored in the buffer 46.

Figure 9:
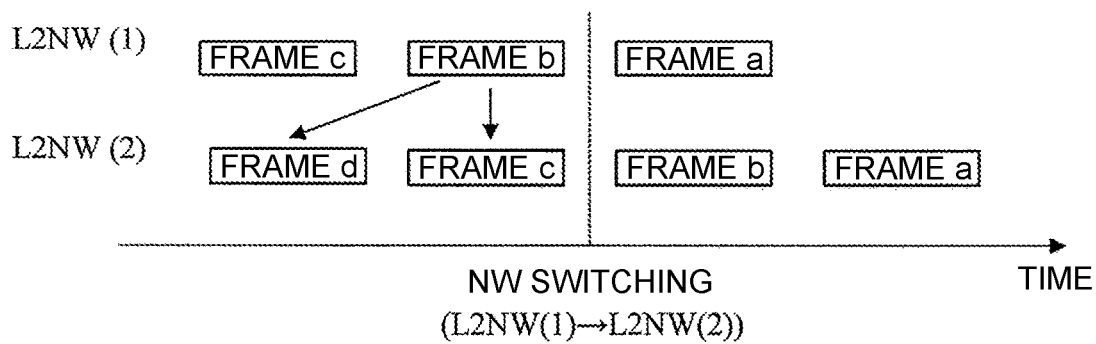
FIG. 9 is a diagram for explaining a comparison method for frames according to the present invention.
Figure 9:
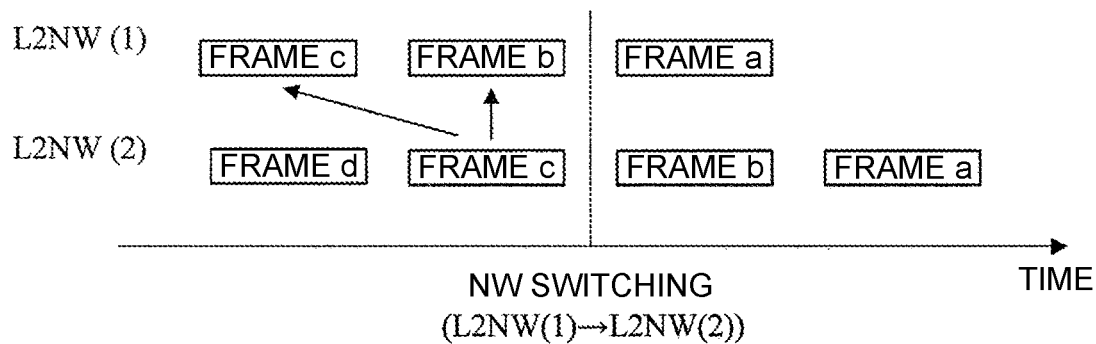

FIG. 9 is a diagram for explaining the operation of the comparing unit 47.

The comparing unit 47 simultaneously performs first comparison shown in FIG. 9(A) and second comparison shown in FIG. 9(B). Specifically, the comparing unit 47 performs:

first comparison (FIG. 9(A)) for, at a point in time when the transfer information is about to be changed, setting a frame from the L2NW(1) transmitting a frame currently transferred to the access accommodation port AP1 as a reference and comparing the frame and a frame from the L2NW(2) transmitting a frame to be transferred to the access accommodation port AP1 in future, among the frames stored in the buffer 46; and second comparison (FIG. 9(B)) for setting the frame from the L2NW(2) transmitting the frame to be transferred to the access accommodation port AP1 in future as a reference and comparing the frame and the frame from the L2NW(1) transmitting the frame currently transferred to the access accommodation port AP1.

If the frames are same in the first comparison, the comparing unit 47 sends, to the frame selecting unit 43, among the frames stored in the buffer 46, frames up to the frame from the L2NW(2) transmitting the frame to be transferred to the access accommodation port AP1 in future, the frame being the immediately preceding frame successfully confirmed as being the same frame, and, thereafter, enables a change of the transfer information.

Further, if the frames are the same in the second comparison, the comparing unit 47 sends, to the frame selecting unit 43, among the frames stored in the buffer 46, frames up to the frame from the L2NW(1) transmitting the frame currently transferred to the access accommodation port AP1, the frame being the immediately preceding frame successfully confirmed as being the same frame, and, thereafter, enables a change of the transfer information.

On the other hand, if the frames are not the same in the first comparison and not the same in the second comparison either, the comparing unit 47 disables a change of the transfer information and performs the first comparison and the second comparison again with a next frame of the L2NW transmitting a frame that is not the reference among the frames stored in the buffer 46.

[Pre-Network Switching Operation]

First, an operation before network switching is explained. Only an operation different from the operation of the communication system 301 in the first embodiment is explained.

Before NW switching, frames received from the L2NW (1) and the L2NW(2) are stored in the buffer for frame storage 46. The frame comparing unit 47 takes out, from the buffer for frame storage 46, the frames received from the L2NW(1) and the L2NW(2) and passes the frames to the frame selecting unit 43.

[Network Switching Time Operation]

Subsequently, an operation at a network switching time is explained. Only an operation different from the operation of the communication system 301 in the first embodiment is explained.

As explained above, when the setting for switching the L2NW is performed for the reception-side accommodation SW 11, the frame comparing unit 47 performs the first comparison for setting a frame from the L2NW(1) at a certain point in time as a reference and determining whether the frame is the same as a frame from the L2NW(2) and the second comparison for setting a frame from the L2NW(2) at a certain point in time as a reference and determining whether the frame is the same as a frame from the L2NW(1). There are the following two methods for the determination about whether the frames are the same.

(i) Comparing bit strings of the entire frames and determining whether the frames are the same according to whether all bits are the same.

(ii) Comparing FCS sections of the frames and determining whether the frames are the same according to whether bits of the FCS sections are the same.

Note that, in the method of (ii), since a range of comparison targets is narrow, a processing amount for the comparison can be reduced compared with the method of (i).

When the frame from the L2NW(1) is set as a reference and it is successfully confirmed that the frame is the same as the frame from the L2NW(2), the frame comparing unit 47 passes, to the frame selecting unit 43, only frames from the L2NW(2) up to the immediately preceding frame of the frame successfully confirmed as being the same. Thereafter, the transfer information retained by the transfer-information storing unit 42 is changed. The frame comparing unit 47 passes the frames to the frame selecting unit 43. When the frame from the L2NW(2) is set as a reference and it is successfully confirmed that the frame is the same as the frame from the L2NW(1), the frame comparing unit 47 passes, to the frame selecting unit 43, only frames from the L2NW(1) up to the immediately preceding frame of the frame successfully confirmed as being the same. Thereafter, the transfer information retained by the transfer-information storing unit 42 is changed. The frame comparing unit 47 passes the frames to the frame selecting unit 43.

On the other hand, when it is successfully confirmed that the frames from both of the L2NWs are not the same, when the frame from the L2NW(1) is set as a reference and compared, the frame comparing unit 46 performs comparison with the next frame from the L2NW(2) and, when the frame from the L2NW(2) is set as a reference and compared, the frame comparing unit 46 performs comparison of the next frame from the L2NW(1).

Effects of the Third Embodiment

Figure 8:
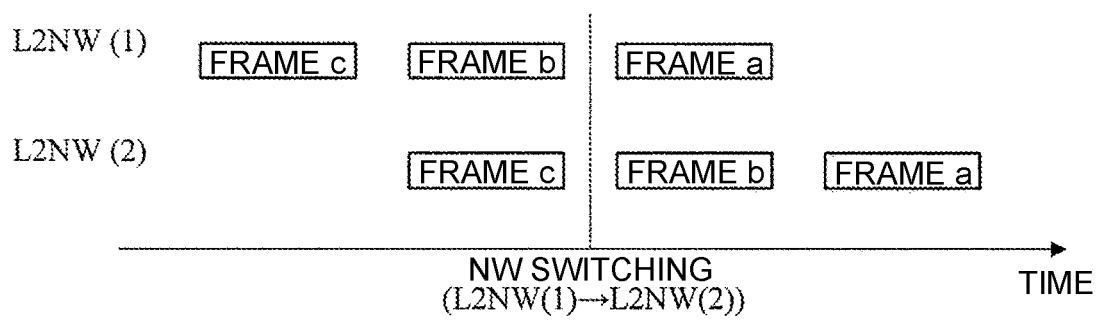
FIG. 8 is a diagram for explaining a problem of the present invention.
Figure 8:
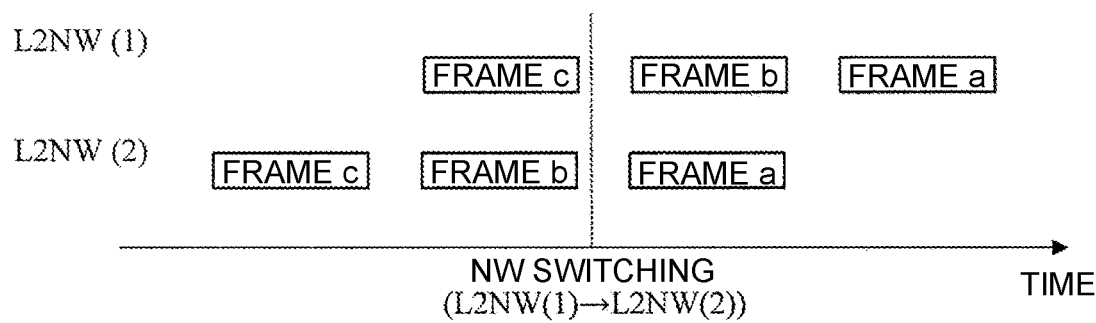

FIG. 8(A) is a diagram for explaining a frame loss that occurs at an L2NW switching time.

In the case of (NW delay in the L2NW(1))>(delay in the L2NW(2)), a frame "a" from the L2NW(1) is transferred and, thereafter, when NW switching is performed from the L2NW(1) to the L2NW(2), a frame "c" from the L2NW(2) is transferred. Therefore, in this case, it is likely that a frame "b" is not transferred and a loss of a frame occurs at the L2NW switching time.

On the other hand, FIG. 8(B) is a diagram for explaining redundant transfer that occurs at the L2NW switching time.

In the case of (NW delay in the L2NW1)<(delay in the L2NW2), the frame "b" from the L2NW(1) is transferred and, thereafter, when NW switching is performed from the L2NW(1) to the L2NW(2), the frame "b" from the L2NW(2) is transferred. Therefore, in this case, the frame "b" is transferred twice.

The communication system 303 compares the frame from the L2NW(1) and the frame from the L2NW(2) and carries out NW switching when both the frames are the same. Consequently, it is possible to prevent a frame loss and redundant transfer at the NW switching time.

Fourth Embodiment

The transmission-side accommodation SW 10 and the reception-side accommodation SW 11 can be realized by a computer and a program as well. The program can be recorded in a recording medium or can be provided through a network.

FIG. 12 shows a block diagram of a system 100. The system 100 includes a computer 105 connected to a network 135.

The network 135 is a data communication network. The network 135 may be a private network or a public network and can include any one or all of (a) a personal area network covering, for example, a certain room, (b) a local area network covering, for example, a certain building, (c) a campus area network covering, for example, a certain campus, (d) a metropolitan area network covering, for example, a certain city, (e) a wide area network covering, for example, a region connected across boundaries of cities, regions, or nations, or (f) the Internet. The communication is performed by an electric signal and an optical signal via the network 135.

The computer 105 includes a processor 110 and a memory 115 connected to the processor 110. In this specification, the computer 105 is represented as a standalone device. However, the computer 105 is not limited to such a device and, rather, may be connected to not-shown another device in a distributed processing system.

The processor 110 is an electronic device configured by a logical circuit that responds to an instruction and executes the instruction.

The memory 115 is a readable storage medium for a tangible computer in which a computer program is encoded. Concerning this point, the memory 115 stores data and instructions, that is, program codes readable and executable by the processor 110 in order to control the operation of the processor 110. The memory 115 can be realized by a random access memory (RAM), a hard drive, a read-only memory (ROM), or a combination of the foregoing. One of constituent elements of the memory 115 is a program module 120.

The program module 120 includes an instruction for controlling the processor 110 to execute a process described in this specification. In this specification, operations are explained as being executed by the computer 105 or a method or a process or a low-order process of the process. However, the operations are actually executed by the processor 110.

In this specification, the term "module" is used to indicate a functional operation that could be realized as a standalone constituent element or an integrated configuration including a plurality of low-order constituent elements. Therefore, the program module 120 can be realized as a single module or a plurality of modules that operate in cooperation with one another. Further, in this specification, the program module 120 is explained as being installed in the memory 115 and, therefore, realized by software. However, the program module 120 can be realized by any one of hardware (for example, an electronic circuit), firmware, software, or a combination of the foregoing.

The program module 120 is shown as being already loaded to the memory 115 but may be configured to be located on a storage device 140 to be loaded to the memory 115 later. The storage device 140 is a readable storage medium for a tangible computer that stores the program module 120. Examples of the storage device 140 include a compact disk, a magnetic tape, a read-only memory, an optical storage medium, a hard drive or a memory unit configured by a plurality of parallel hard drives, and a universal serial bus (USB) flash drive. Alternatively, the storage device 140 may be a random access memory or an electronic storage device of another type located in a not-shown remote storage system and connected to the computer 105 via the network 135.

The system 100 further includes a data source 150A and a data source 150B collectively referred to as data source 150 in this specification and communicably connected to the network 135. Actually, the data source 150 can include any number of data sources, that is, one or more data sources. The data source 150 includes un-systemized data and can include social media.

The system 100 further includes a user device 130 operated by a user 101 and connected to the computer 105 via the network 135. Examples of the user device 130 include a keyboard or an input device such as a sound recognition subsystem for enabling the user 101 to communicate selection of information and a command to the processor 110. The user device 130 further includes a display device or a printer or an output device such as a sound synthesizing device. A mouse, a trackball, or a cursor control unit such as a touch sensitive screen enables the user 101 to operate a cursor on a display device in order to communicate further selection of information and an instruction to the processor 110.

The processor 110 outputs a result 122 of the execution of the program module 120 to the user device 130. Alternatively, the processor 110 can bring an output to, for example, a database or a storage device 125 such as a memory or bring the output to a not-shown remote device via the network 135.

For example, a program for performing the operation explained with reference to FIG. 4 to FIG. 7 may be the program module 120. The system 100 can be caused to operate as the transmission-side accommodation SW 10 and the reception-side accommodation SW 11.

The term "including . . . " designates presence of a characteristic, a perfect body, a process, or a constituent element mentioned therein but should be interpreted as not excluding presence of one or more other characteristics, perfect bodies, processes, or constituent elements or a group of the forgoing. The term "a" and "an" are indefinite articles and, therefore, do not exclude an embodiment including a plurality of the terms.

Other Embodiments

Note that the present invention is not limited to the embodiments and can be variously modified and carried out in a range not departing from the gist of the present invention. In short, the present invention is not limited to the embodiments per se. In an implementation stage, the constituent elements can be modified and realized in the range not departing from the gist of the present invention. For example, in the embodiments, the operation of the communication system is explained in the case of the two L2NWs. However, this communication system operates in the same manner in the case of three or more L2NWs.

Various inventions can be formed by appropriate combinations of a plurality of constituent elements disclosed in the embodiments. For example, several constituent elements may be deleted from all the constituent elements described in the embodiments. Further, the constituent elements described in different embodiments may be combined as appropriate.

REFERENCE SIGNS LIST

10 Transmission-side switching device (transmission-side accommodation SW)
11 Reception-side switching device (reception-side accommodation SW)
20, 21 User device
31 Connection-destination-information storing unit
32 Frame duplicating unit
33 Frame-information imparting unit
34 Information setting unit
41 Connection-destination-information storing unit
42 Transfer-information storing unit
43 Frame selecting unit
44 Information setting unit
45 Frame confirming unit
46 Buffer for frame storage
47 Frame comparing unit
100 System
101 User
105 Computer
110 Processor
115 Memory
120 Program module
122 Result
125 Storage device
130 User device
135 Network
140 Storage device
150 Data source
301 to 303 Communication system

The invention claimed is:

1. A communication system in which a transmission-side switching device and a reception-side switching device are connected to a plurality of layer 2 networks (L2NWs), the transmission-side switching device including:

transmission-side relay ports to which respective L2NWs are connected;
a transmission-side connection destination-information memory that retains information concerning each of the transmission-side relay ports and the respective L2NWs; and
a frame duplicating unit, implemented with one or more processors, that duplicates, by a number of the transmission-side relay ports, a frame, input from a transmission-side user device, into a plurality of frames, and transmits the duplicated plurality of frames to the respective L2NWs connected to the transmission-side relay ports, wherein the reception-side switching device includes:
reception-side relay ports that are connected to the respective L2NWs and through which the plurality of frames are received from the respective L2NWs;
an access accommodation port to which a reception-side user device is connected;
a reception-side-connection-destination-information memory that retains information concerning each of the reception-side relay ports and the respective L2NWs;
a transfer-information memory that retains transfer information for each L2NW, comprising (i) transfer information for a first L2NW indicating that a frame from the first L2NW is allowed to be transferred to the access accommodation port and (ii) transfer information for other L2NWs indicating that a frame from any of the other L2NWs is not allowed to be transferred to the access accommodation port;
a frame selecting unit, implemented with one or more processors, that
selects, from the plurality of frames based on the transfer information for the first L2NW retained by the transfer-information memory, a first frame from the first L2NW, and transfer the first frame to the access accommodation port, and
discards other duplicate frames that are included in the plurality of frames and received from the other L2NWs, based on the transfer information for the other L2NWs; and
an information setting unit, implemented with one or more processors, that changes the transfer information retained by the transfer-information memory when the L2NW transmitting a frame currently transferred to the access accommodation port is switched to another one of the L2NWs.

2. The communication system according to claim 1, wherein the transmission-side switching device further includes a frame-information imparting unit, implemented with one or more processors, that, when the frame selecting unit of the reception-side switching device is intended to select a frame transmitted by any one L2NW among the respective L2NWs, imparts switching information to a frame input from the user device and passes, to the frame duplicating unit, the frame to which the switching information is imparted, and wherein the reception-side switching device further includes a frame confirming unit, implemented with one or more processors, that confirms a presence or an absence of a frame to which the switching information is imparted among frames from the respective L2NWs received via the reception-side relay ports and, when the frame is present, changes, based on the switching information, the transfer information retained by the transfer-information memory.

3. The communication system according to claim 1, wherein the reception-side switching device further includes:
- a buffer that stores, for each of the respective L2NWs, frames from the respective L2NWs; and
- a comparing unit, implemented with one or more processors, that compares, among the respective L2NWs, the frames stored in the buffer, wherein the comparing unit performs:
  - a first comparison for, at a point in time when the transfer information is about to be changed, setting a frame from the L2NW transmitting a frame currently transferred to the access accommodation port as a reference and comparing the frame and a frame from the L2NW transmitting a frame to be transferred to the access accommodation port in future, among the frames stored in the buffer; and
  - a second comparison for setting the frame from the L2NW transmitting the frame to be transferred to the access accommodation port in future as a reference and comparing the frame and the frame from the L2NW transmitting the frame currently transferred to the access accommodation port,
- wherein, if the frames are same in the first comparison, sends, to the frame selecting unit, among the frames stored in the buffer, frames up to the frame from the L2NW transmitting the frame to be transferred to the access accommodation port in future, the frame being an immediately preceding frame successfully confirmed as being the same frame, and, thereafter, enables a change of the transfer information,
- wherein, if the frames are the same in the second comparison, sends, to the frame selecting unit, among the frames stored in the buffer, frames up to the frame from the L2NW transmitting the frame currently transferred to the access accommodation port, the frame being an immediately preceding frame successfully confirmed as being the same frame, and, thereafter, enables a change of the transfer information, and
  - wherein, if the frames are not the same in the first comparison and not the same in the second comparison either, disables a change of the transfer information and performs the first comparison and the second comparison again with a next frame of the L2NW transmitting a frame that is not the reference among the frames stored in the buffer.

4. A communication method in a communication system in which a transmission-side switching device and a reception-side switching device are connected to a plurality of layer 2 networks (L2NWs), the communication method comprising:
- duplicating a frame, input from a transmission-side user device, into a plurality of frames;
- transmitting the duplicated plurality of frames to the plurality of L2NWs from the transmission-side switching device;
- receiving the plurality of frames from the plurality of L2NWs;
- referring to transfer information for each L2NW comprising (i) transfer information for a first L2NW indicating that a frame from the first L2NW is allowed to be transferred to a reception-side user device is connected and (ii) transfer information for other L2NWs indicating that a frame from any of the other L2NWs is not allowed to be transferred;
- selecting, from the plurality of frames based on the transfer information for the first L2NW, a first frame from the first L2NW;
- discarding other duplicate frames that are included in the plurality of frames and received from the other L2NWs, based on the transfer information for the other L2NWs; and
- changing the transfer information when the L2NW transmitting a frame currently transferred to the reception-side user device is switched to another one of the L2NWs.

5. A reception-side switching device connected to a transmission-side switching device by a plurality of layer 2 networks (L2NWs), the reception-side switching device comprising:
- reception-side relay ports that are connected to respective L2NWs and through which a plurality of duplicate frames are received from the respective L2NWs;
- an access accommodation port to which a reception-side user device is connected;
- a reception-side-connection-destination-information memory that retains information concerning each of the reception-side relay ports and the respective L2NWs;
- a transfer-information memory that retains transfer information for each L2NW, comprising (i) transfer information for a first L2NW indicating that a frame from the first L2NW is allowed to be transferred to the access accommodation port and (ii) transfer information for other L2NWs indicating that a frame from any of the other L2NWs is not allowed to be transferred to the access accommodation port;
- a frame selecting unit, implemented with one or more processors, that
  - selects, from the plurality of duplicate frames based on the transfer information for the first L2NW retained by the transfer-information memory, a first frame from the first L2NW, and transfer the first frame to the access accommodation port, and
  - discards other duplicate frames that are included in the plurality of duplicate frames and received from the other L2NWs, based on the transfer information for the other L2NWs; and
- an information setting unit, implemented with one or more processors, that changes the transfer information retained by the transfer-information memory when the L2NW transmitting a frame currently transferred to the access accommodation port is switched to another one of the L2NWs.

* * * * *